US006738385B1

(12) United States Patent
Iwamoto (10) Patent No.: US 6,738,385 B1
(45) Date of Patent: May 18, 2004

(54) ATM CELL BUFFER READ CONTROL SYSTEM AND CONTROL METHOD

(75) Inventor: Hiroyuki Iwamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/388,342

(22) Filed: Sep. 1, 1999

(30) Foreign Application Priority Data

Sep. 2, 1998 (JP) ........................................... 10-247671

(51) Int. Cl.[7] ............................................... H04L 12/28
(52) U.S. Cl. ...................... 370/412; 370/413; 370/415; 370/417
(58) Field of Search ................................ 370/229, 230, 370/230.1, 235, 231, 232, 233, 234, 236.1, 252, 253, 360, 395.1, 397, 399, 395.21, 395.3, 395.4, 395.41, 395.42, 412, 413, 415, 417, 428

(56) References Cited

U.S. PATENT DOCUMENTS

| | | | | |
|---|---|---|---|---|
| 5,913,074 A | * | 6/1999 | Ikeda et al. ................. | 370/235 |
| 5,926,458 A | * | 7/1999 | Yin ............................. | 370/230 |
| 6,208,619 B1 | * | 3/2001 | Takeuchi .................... | 370/229 |
| 6,408,005 B1 | * | 6/2002 | Fan et al. ................... | 370/412 |
| 6,452,905 B1 | * | 9/2002 | Smith et al. ............. | 370/236.1 |
| 6,473,432 B1 | * | 10/2002 | Nishimura et al. ......... | 370/412 |

FOREIGN PATENT DOCUMENTS

| | | |
|---|---|---|
| JP | H7-66807 | 3/1995 |
| JP | 7-66807 | 3/1995 |
| JP | H8-340336 | 12/1996 |
| JP | 8-340336 | 12/1996 |
| JP | H9-130400 | 5/1997 |
| JP | 9-162906 | 6/1997 |
| JP | H9-162906 | 6/1997 |
| JP | 9-238147 | 9/1997 |
| JP | H9-238147 | 9/1997 |
| JP | H9-298549 | 11/1997 |

* cited by examiner

Primary Examiner—Phirin Sam
(74) Attorney, Agent, or Firm—Sughrue Mion, PLLC (57) ABSTRACT

An ATM cell buffer read control system prevents over-rate due to excessive use of an extra line capacity with guarantee of a minimum output rate in a WRR system. The ATM cell buffer read control system effectively uses a band by distributing an extra band with a ratio of number of ATM cell number per connection with guarantee of minimum output band per connection according to preliminarily set ratio of output ATM cell number per a given period. The ATM cell buffer read control system makes judgment whether the output band after distribution of the extra band falls within a reference output range.

16 Claims, 8 Drawing Sheets

ATM CELL BUFFER READ CONTROL SYSTEM AND CONTROL METHOD

BACKGROUND OF THE INVENTION

1. Field of the Invention

The present invention relates generally to an ATM cell buffer read control system and a control method. More particularly, the invention relates to an ATM cell buffer read control system and a control method which can effectively use a band by distributing an extra band according to number of output ATM cells per connection with guarantee of minimum output band per connection in accordance with ratios of output ATM cell number per a preliminarily set given period.

2. Description of the Related Art

Conventionally, there has been proposed a read control system employing Weight Round Robin (WRR) as one read system in an ATM cell buffer control portion.

In the WRR system, selecting operation for outputting data with different weights is performed for guarantee of minimum speed of data output according to ratio of the weight for respective queues and extra output line capacity is distributed according to weight for respective queues.

Examples of ATM cell buffer reading control system has been disclosed in Japanese Unexamined Patent Publication No. Heisei 7-66807 (hereinafter referred to as prior art 1), Japanese Unexamined Patent Publication No. Heisei 8-340336 (hereinafter referred to as prior art 2), Japanese Unexamined Patent Publication No. Heisei 9-162906 (hereinafter referred to as prior art 3) and Japanese Unexamined Patent Publication No. Heisei 9-238147 (hereinafter referred to as prior art 4).

The prior art 1 disposes cell out of a range of band. The prior art 2 causes fluctuation to a range of band depending upon necessity. The prior art 3 outputs ATM cells in sequential descending order of weights, and inhibits outputting of cell when number of cells exceeds a threshold value. The prior art 4 performs modification of band utilizing a vacant band.

However, in the read control system employing the WRR system, if extra capacity is excessively large, an output rate from a particular queue is increased to cause input rate error in a User Parameter Control (UPC) function portion in an ATM line receiving terminal in the next stage to cause disposal of the ATM cells.

Means for solving the problem in such system has not been disclosed in any of the foregoing prior arts 1 to 4.

SUMMARY OF THE INVENTION

Therefore, it is an object of the present invention to provide an ATM cell buffer read control system and a control method which can prevent occurrence of over-rate due to excessive use of extra line capacity with guarantee of minimum output rate in a WRR system.

In order to accomplish the above-mentioned object, according to the first aspect of the present invention, an ATM cell buffer read control system for effectively using a band by distributing an extra band with a ratio of number of ATM cell number per connection with guarantee of minimum output band per connection according to preliminarily set ratio of output ATM cell number per a given period, comprises:

judgment means for making judgment whether the output band after distribution of said extra band falls within a reference output range.

According to the second aspect of the present invention, an ATM cell buffer read control method for effectively using a band by distributing an extra band with a ratio of number of ATM cell number per connection with guarantee of minimum output band per connection according to preliminarily set ratio of output ATM cell number per a given period, comprises:

a first process of making judgment whether the output band after distribution of said extra band falls within a reference output range.

According to the foregoing first and second aspects of the present invention, the judgment means and the first process make judgment that the output bands after distribution of the extra band fall with the reference output band.

On the basis of the result of judgment, it is determined whether the ATM cell is to be output or not. Therefore, it is at least possible to avoid problem to output the ATM cell without checking to cause over-rate due to excessive use of extra line capacity and thus result in violation of UPC in the UPC function portion in the ATM line receiving terminal in the next stage to result in disposal of the ATM cell.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

Figure 1:
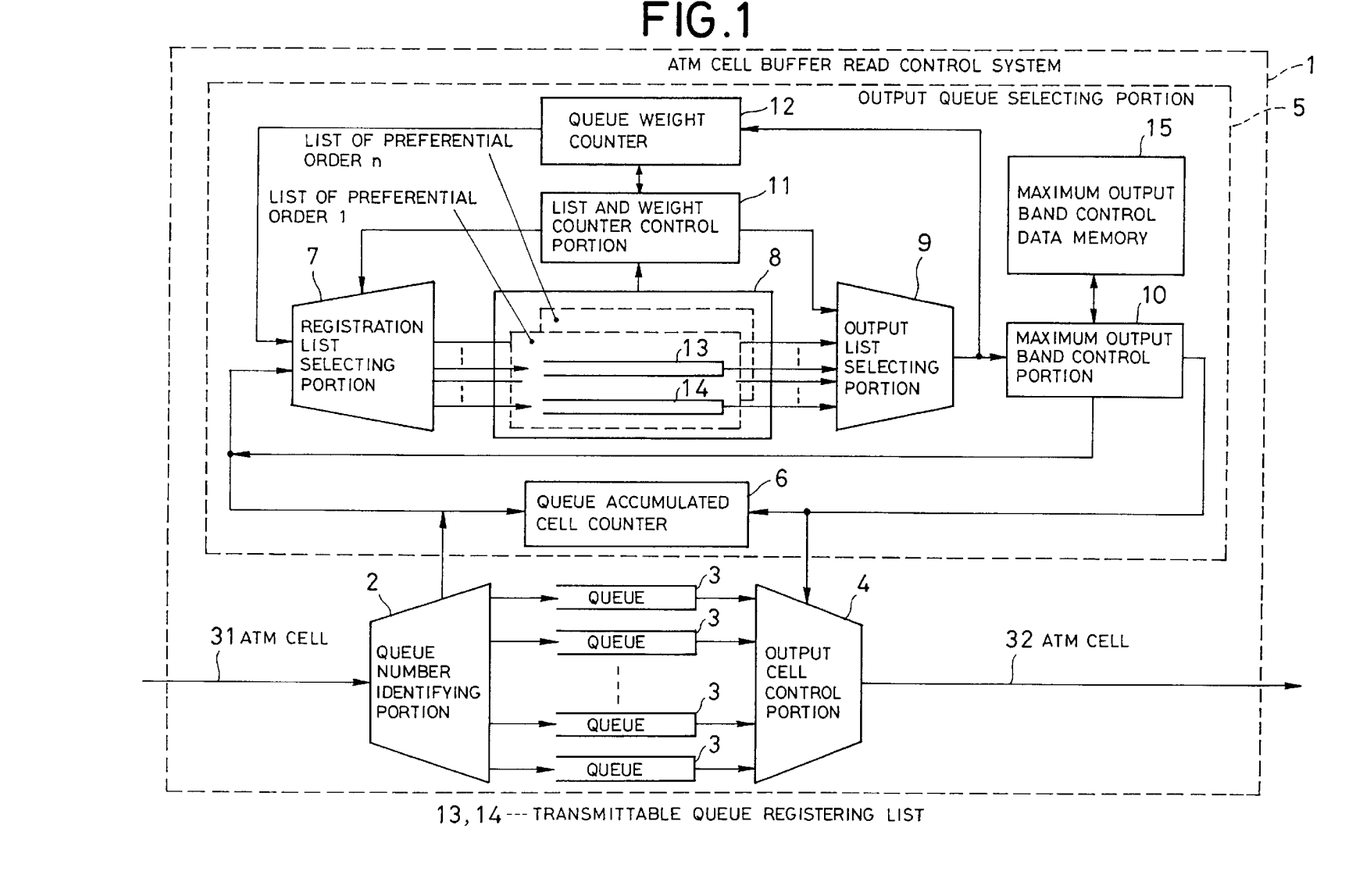
FIG. 1 is a block diagram showing a construction of the preferred embodiment of an ATM cell buffer read control system according to the present invention.

FIG. 1 is a block diagram showing a construction of the preferred embodiment of an ATM cell buffer read control system according to the present invention.

As shown in FIG. 1, an ATM cell buffer read control system 1 is constructed with a plurality of queues 3 provided per connection, a queue number identifying portion 2 identifying connection on the basis of a received ATM cell 31 and writing in a corresponding queue 3, an output queue selecting portion 5 for selecting queue 3 to be output in response to an ATM cell output demand from the queues 3, and an output cell control portion 4 reading out one of ATM cell data from queues 3 according to designation from the output queue selecting portion 5 and outputting the same.

The output queue selecting portion 5 is constructed with a queue weight counter 12 storing a weight value indicative of a minimum output band of per queue in each connection, a queue accumulated cell counter 6 counting number of accumulated ATM cell data per the queue 3, a registration list selecting portion 7 checking whether data in the queue 3 can be transmitted or not and selecting the queue 3 when the data therein is judged as that can be transmitted, a transmittable queue registering list 13 storing queue number of the queue 3, in which one or more ATM data is present and the weight counter value of the queue 3 is greater than or equal to one, a non-transmittable queue registering list 14 storing queue number of the queue 3, in which one or more ATM data is present and the weight counter value of the queue 3 is zero, a list and weight counter control portion 11 performing switching between the transmittable queue registering list 13 and the non-transmittable queue registering list 14 and re-setting of the weight value for the weight counter 12, an output list selecting portion 9 for selecting an output list among the transmittable queue registering list 13 and the non-transmittable queue registering list 14, and a maximum output band control portion 10 making judgment whether a cell output rate from the queue of the queue number selected by the output list selecting portion 9 is in maximum output band error or not.

On the other hand, the transmittable queue registering list 13 and the non-transmittable queue registering list 14 are separated per preferential order. In the shown embodiment, the transmittable queue registering list 13 and the non-transmittable queue registering list 14 are consisted of n in number of lists 8 (n is positive integer) having preferential order 1 to n.

Taking out of the queue number from the transmittable queue registering list 13 which will be discussed later, is performed in the sequential descending order from one having higher preferential order.

Figure 2:
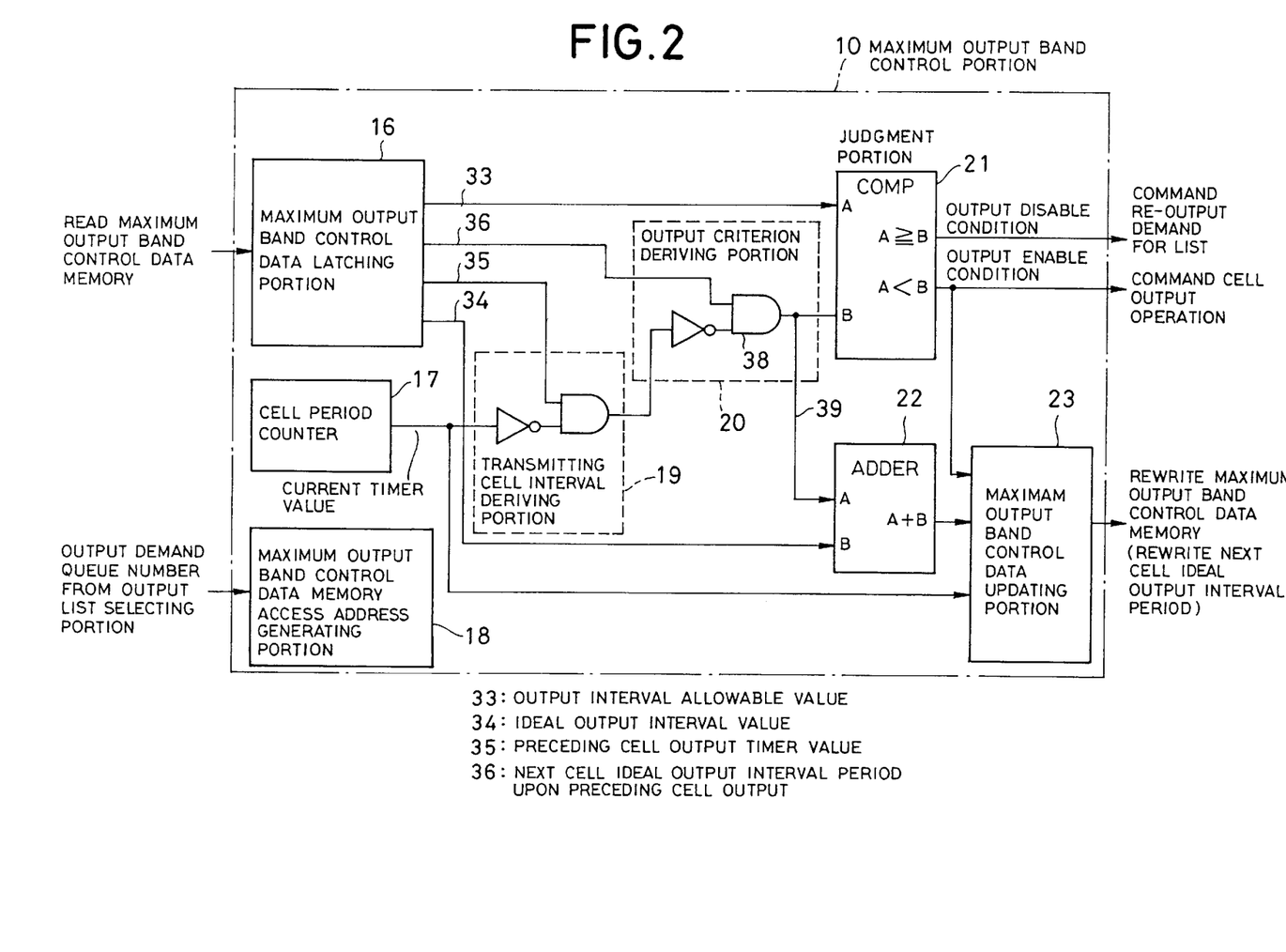
FIG. 2 is a block diagram showing a detailed construction of a maximum output band control portion 10 in the preferred embodiment of the ATM cell buffer read control system of FIG. 1.

Next, an example of construction of the maximum output band control portion 10 employing Generic Cell Rate Algorithm (GCRA) is illustrated in FIG. 2.

The maximum output band control portion 10 includes a maximum output band control memory access address generating portion 18 generating an address of a maximum output band control data memory 15, a maximum output band control data latching portion 16 latching data from the maximum output band control data memory 15 during a current cell output period, a cell period counter 17 deriving a cell output interval, a transmitting cell interval deriving portion 19 deriving an output transmission interval on the basis of a preceding cell output timing and a current timing, an output criterion deriving portion 20 deriving a difference between a next cell transmission interval derived upon outputting of the preceding cell and an actual transmission interval, in which the difference corresponds to fluctuation of the output interval, a judgment portion 21 making judgment whether outputting is permitted or not by checking whether the fluctuation value is less than or equal to the preliminarily set allowable value or not, an adder 22 performing derivation of a next cell ideal output interval value, and a maximum output band control data updating portion 23 writing the value output from the adder 22 and current cell output timing value in the maximum output band control data memory 15.

Figure 3:
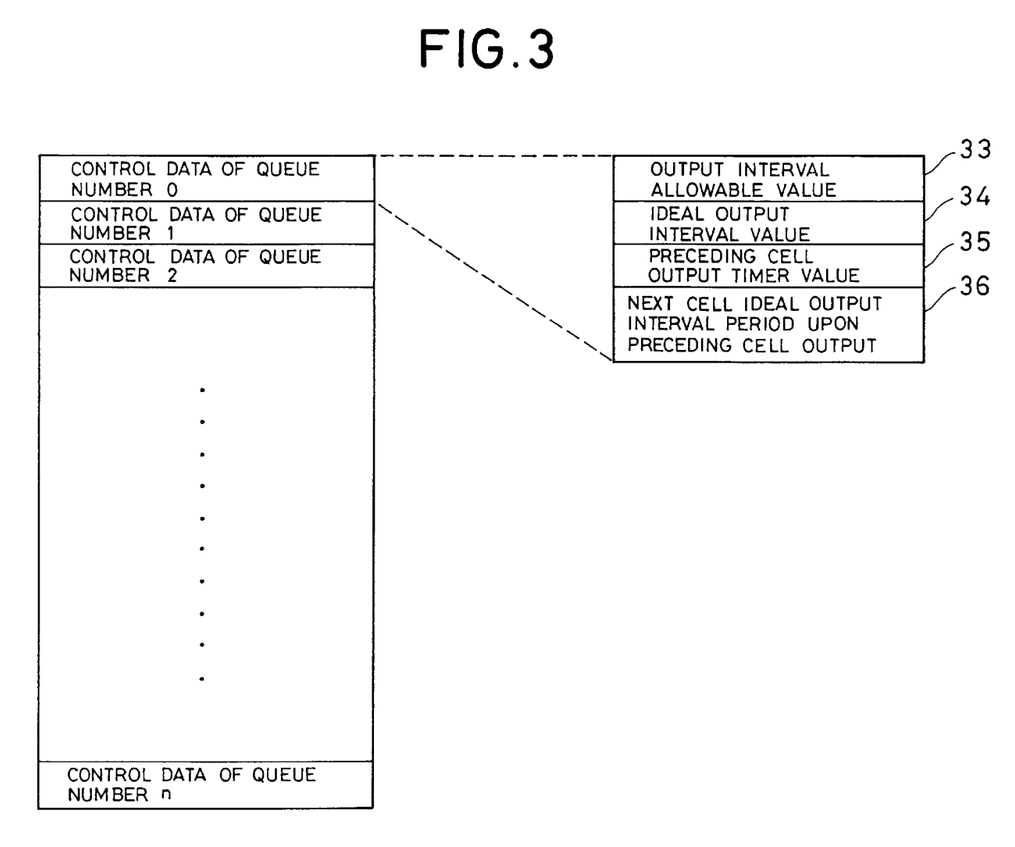
FIG. 3 is an illustration showing a structure of the maximum output band control data memory 15 in the preferred embodiment of the ATM cell buffer read control system of FIG. 1.

FIG. 3 is an illustration showing a structure of the maximum output band control data memory 15. Referring to FIG. 3, the maximum output band control data memory 15 is consisted of an output interval allowable value 33 which is preliminarily set per the queue 3, an ideal output interval value 34, a preceding cell output timer value 35 for deriving an output interval with the next cell upon cell output, and an ideal output interval value 36 for deriving the next cell upon cell output.

Next, the operation of the preferred embodiment of the ATM cell buffer read control system according to the present invention will be discussed in detail. In the initial condition, queue 3 and the list 8 are both vacant, and the queue accumulated cell counter 6 is zero. On the other hand, the queue weight counter 12 is set in the weight value weighting the output rate from the relevant queue. In the maximum output band data memory 15, the output interval allowable value 33, the ideal output interval value 34, the preceding cell output timer value 35 and the next cell ideal output interval value 367 are set per the queue.

FIGS. 4 to 7 are flowcharts showing operation of the preferred embodiment of the ATM cell buffer read control system according to the present invention. The following discussion will be given with reference to the flowcharts.

Figure 4:
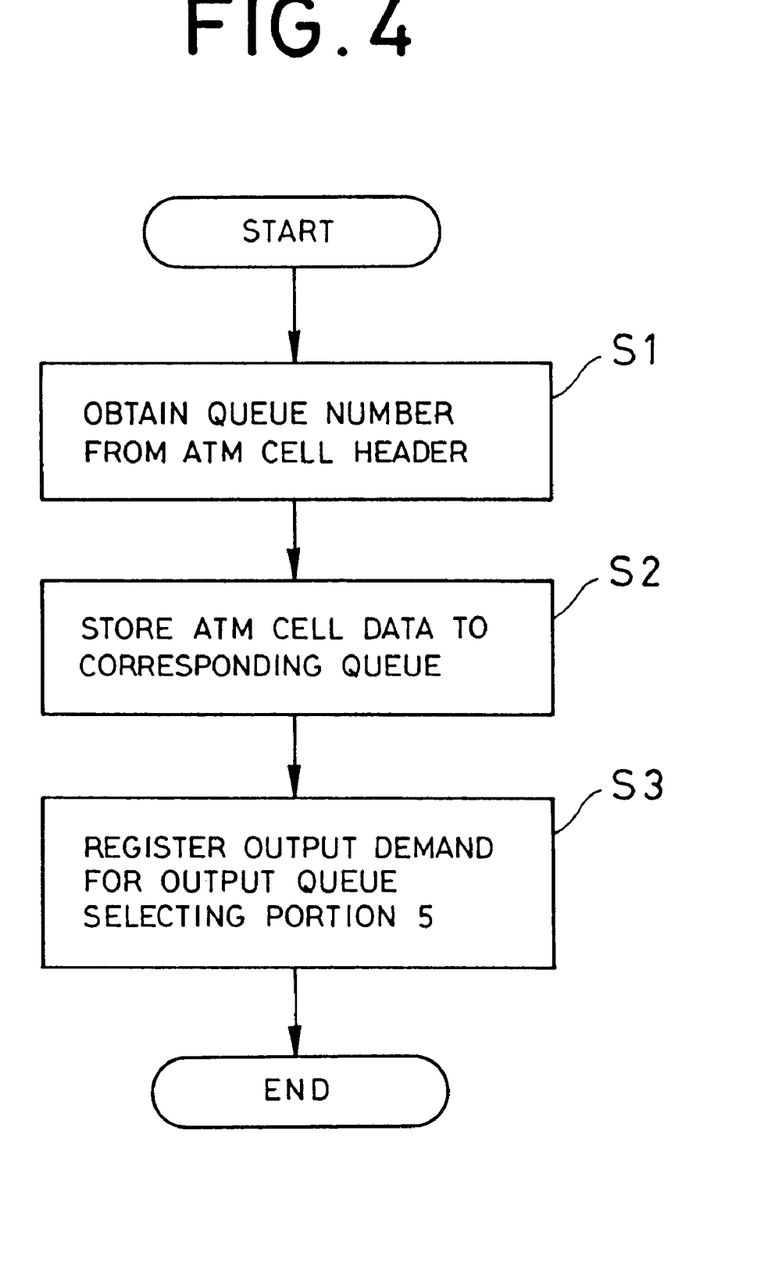
FIG. 4 is a flowchart showing operation of operation of the preferred embodiment of the ATM cell buffer read control system of FIG. 1.

When an input data (ATM cell 31) arrives to the ATM cell buffer read control system 1, the queue number for the ATM cell 31 is attained by the queue number identifying portion 2 (step S1 of FIG. 4). Then, the ATM cell data is accumulated in the corresponding queue 3 (step S2 of FIG. 4). At the same time, the queue number is fed to the output queue selecting portion 5 as an output demand from the queue.

Figure 5:
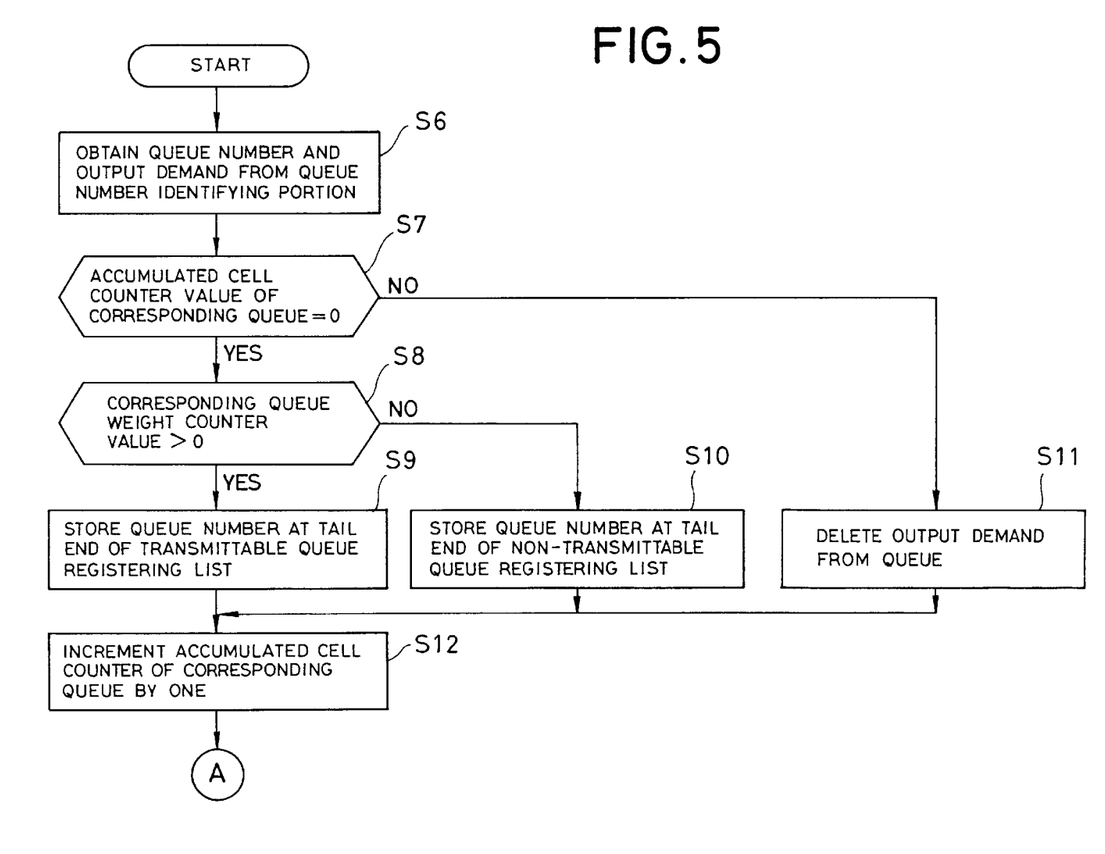
FIG. 5 is a flowchart showing operation of operation of the preferred embodiment of the ATM cell buffer read control system of FIG. 1.

On the other hand, in the registration list selecting portion 7 in the output queue selecting portion, the queue number is obtained (step S6 of FIG. 5). When the accumulated ATM cell of the queue 3 is other than the ATM cell input at the current time (answer is NO at step S7), the transmitted output demand is disposed (step S1). Otherwise (answer is YES at step S7), the value of the weight counter 12 of the queue 3 is checked (step S8). If the value is zero (answer is NO at step S8), the queue number is stored at the tail end of the non-transmittable queue registering list 14. If the value of the weight counter 12 is greater than or equal to one (answer is YES at step S8), the queue number is stored in the tail end of the transmittable queue registering list 13 (step S9). Then, the value of the accumulated ATM cell counter 6 of the queue number is incremented by one (step S12).

Figure 6:
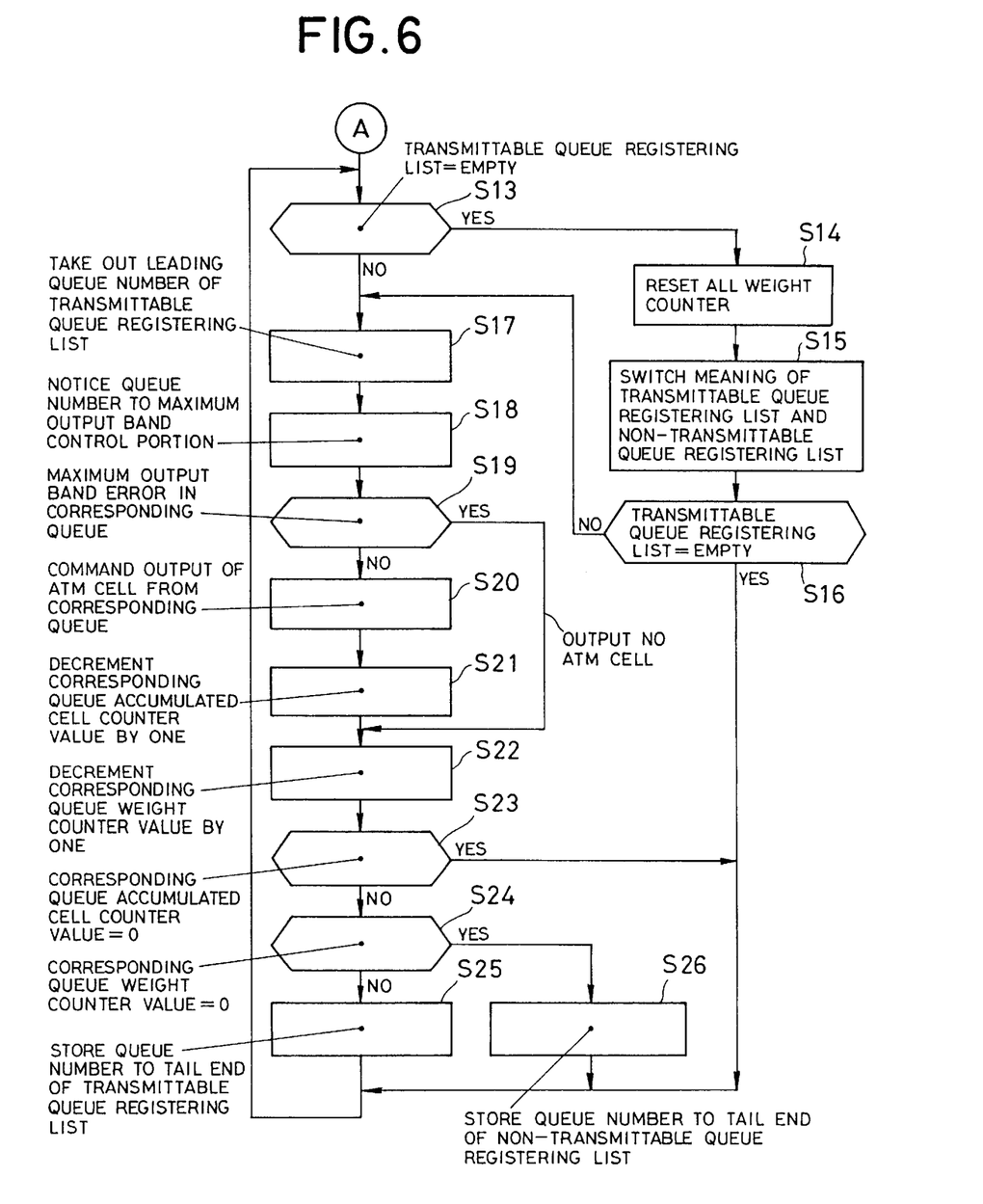
FIG. 6 is a flowchart showing operation of operation of the preferred embodiment of the ATM cell buffer read control system of FIG. 1.
Figure 7:
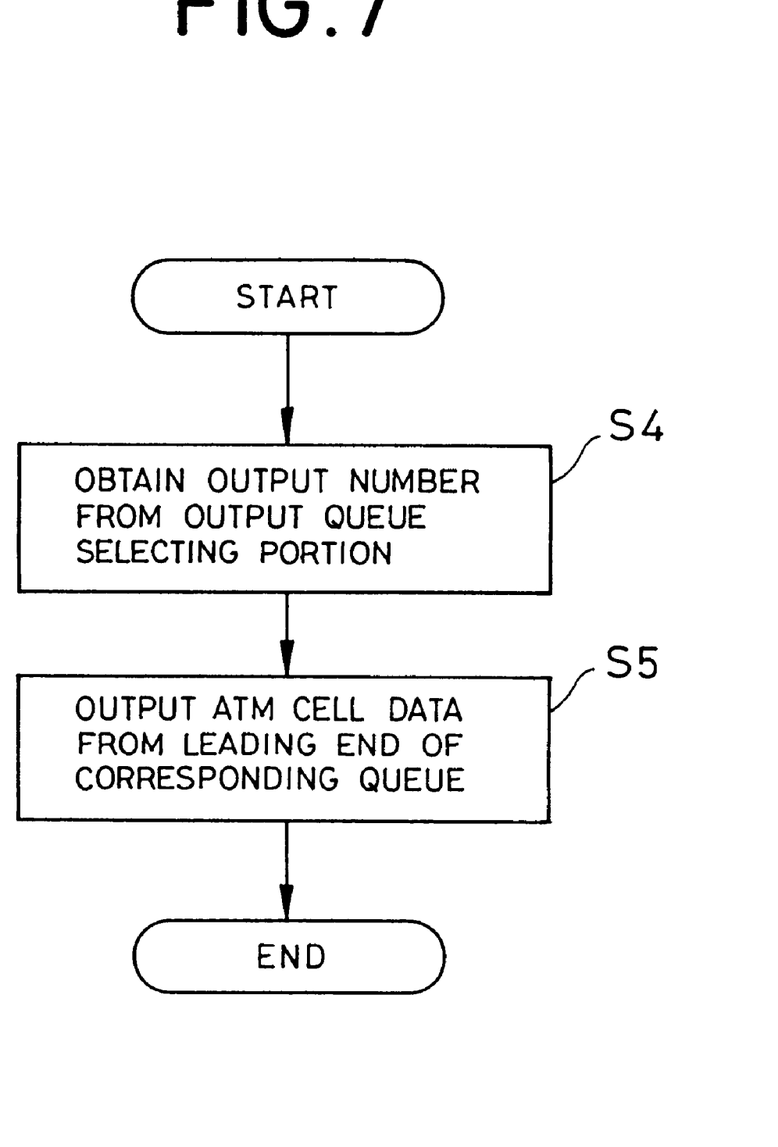
FIG. 7 is a flowchart showing operation of operation of the preferred embodiment of the ATM cell buffer read control system of FIG. 1.

Next, per each ATM cell output period, number of registered queue of the transmittable queue registration list 13 is checked in the output queue selecting portion 5 (step S13 of FIG. 6). If no queue is registered (answer is YES at step S13), the weight counter 12 for all queue are again reset to initial set values (step S14), and meanings of the transmittable queue registering list 13, the non-transmittable queue registering list 14 are switched (step S15) and the number of registered queue of the transmittable queue registering list 13 is again checked (step S16). If the transmittable queue registering list 13 is empty (answer is YES at step S16), the process in the current ATM cell output period goes END without doing any process. Otherwise (answer is NO at step S16), the queue numbers are taken out from the leading end of the transmittable queue registering list 13 (step S17). If maximum band error is caused by the output from the corresponding queue, (answer is YES at step S19), the process is advanced to step S22 without outputting any ATM cell in the current cell output period. Otherwise (answer is NO at step S19), the maximum output band control portion 10 send a notice to the output control portion 4 so as to output the ATM cells from the leading end of the corresponding queue (step S20), the accumulated cell counter value of the queue is decremented by one (step S21), the weight counter value of the corresponding queue is also decremented by one (step S22), and, subsequently, the accumulated counter of the corresponding queue is read (step S23). If the accumulated counter value is zero (answer is YES at step S23), the process in the current cell output period goes END at that timing. Otherwise (answer is NO at step S23), the weight counter of the corresponding queue is read again for outputting remaining cell in the corresponding queue (step S24). If the weight counter value is zero (answer is YES at step S24), the queue number is stored at the tail end of the non-transmittable queue registering list 14 (step S26). If the weight counter value is other than zero (answer is NO at step S24), the queue number is stored at the tail end of the transmittable queue registering list 13 (step S25), and all process in the current cell output period goes END. Then, in the next output period, the process is returned to step S13 and similar operations as those set forth above is performed.

It should be noted that the output cell control portion 4 receiving notice of ATM cell output at step S20 obtains an output number from the maximum output band control portion 10 in the output queue selecting portion 5 (step S4 of FIG. 7) to output the ATM cell data 32 from the leading end of the corresponding queue.

Next, the embodiment of the present invention will be discussed.

The maximum output band control portion 10 as the first embodiment will be discussed hereinafter in detail. Here, an ideal output cell interval 36 is preliminarily set per queue. A difference between the set value and the actual output interval is derived per cell output as fluctuation of the cell transmission interval. When the fluctuation value is compared with the output interval allowable value 33 preliminarily set per queue. When the output interval allowable value 33 is greater than the fluctuation value (when the output interval is small), the maximum output band error is induced. Then, outputting of the ATM cells from the queue is not performed in the current cell period, and output registration demand is performed for the registered list selecting portion 7 again. When the fluctuation value is smaller, fluctuation of the cell transmission interval becomes less than the maximum output band to make ATM cell output from the queue possible.

In FIG. 2, from the output demand queue number data from the output queue selecting portion 5, a corresponding region of the maximum output band control data memory 15, in which a parameter defining the maximum output rate is read from the corresponding queue.

A transmission interval period as a difference between the preceding cell output timer value 35 (LCT: Last Cell Time) and a current timer value (CT: Current time; count value of the cell period counter 17) is derived by the transmitting cell interval deriving portion 19. Next, in the output criterion deriving portion 20, a difference 39 from an ideal transmission interval is derived on the basis of a difference between the ideal output interval value 36 of the next cell and the interval cell number 38 derived by the transmitting cell interval deriving portion 19. The value of the difference 39 corresponds to the fluctuation value, and compares the output interval allowable value 33 in the judgment portion 21 to make judgment whether the maximum output band error is caused or not.

The maximum output band control data updating portion 23 is active only when no maximum output band error is judged by the judgment portion 21 and the ATM cell output command is issued from the relevant queue for deriving a next ideal output interval period after reception of current output demand by adding the fluctuation of the output interval immediate before reception of the current output demand derived by the output criterion deriving portion 20 and the ideal output interval value 34 of the relevant queue set in the maximum output band control data memory 15 to rewrite data (next cell ideal output interval period 36) on the maximum output band control data memory 15. At the same time, in order to derive number of output interval with the preceding cell upon outputting of the next ATM cell, the maximum output band control data updating portion 23 realizes the function for also rewriting the current output timing value (preceding cell output timer value 35).

Next, the list and weight counter control portion 11 as the second embodiment will be discussed in detail. The list and weight counter control portion 11 has a function for re-loading of the initial set value of the weight counter 12 and switching meaning of the transmittable queue registering list 13 and the non-transmittable queue registering list 14 when the transmittable queue registering list 13 is empty.

Figure 8:
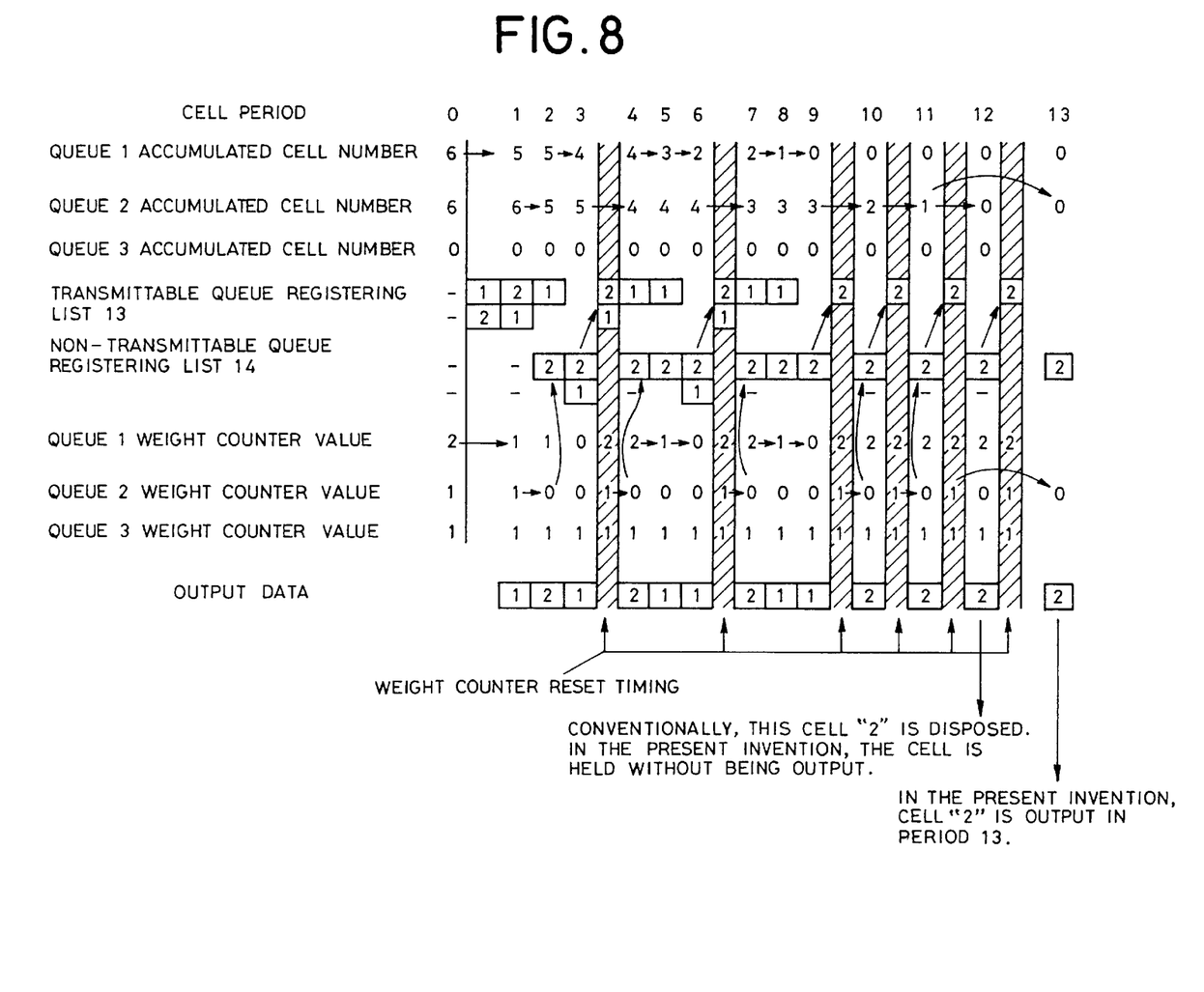
FIG. 8 is a diagrammatic explanatory illustration showing one example of cell output operation when only conventional WRR read system is used.

FIG. 8 is a diagrammatic explanatory illustration showing one example of cell output operation when only the conventional WRR read out system is used.

In FIG. 8, there is shown a condition where two queues are used. Respective queues are assumed as queue 1 and queue 2, the weight counter value of the queue 1 is assumed as 2, the weight counter value of the queue 2 is assumed as 1, the weight counter value of the queue 3 is assumed as 1, five cells are assumed to be accumulated in the queue 1 of the ATM cell buffer in the cell period 1, six cells are assumed to be accumulated in the queue 2 in the cell period 1 and no cell is accumulated in the queue 3 in the cell period 1.

It should be noted that in the cell period 0 (initial condition), the weight counter value of the queue 1 is 2, the weight counter value of the queue 2 is 1 and the weight counter value of the queue 3 is 1, and six cells are accumulated in the queue 1 of the ATM cell buffer, six cells are accumulated in the queue 2 and no cell is accumulated in the queue 3.

Next, operation will be briefly discussed with reference to FIG. 8. With reference to the cell period, the queue number 1 is stored in the leading end of the transmittable queue registering list 13, and in the second sequential order, queue number 2 is stored.

In the cell period 1, the queue number 1 of the leading end of the transmittable queue registering list 13 is transmitted. Accordingly, the accumulated cell of the queue 1 is reduced from six to five. At the same time, weight counter value of the queue 1 is also reduced from two to one. Then, the queue number 2 is moved up to the leading end of the transmittable queue registering list 13.

In the cell period 2, the queue number 2 of the leading end of the transmittable queue registering list 13 is transmitted. Accordingly, the accumulated cell of the queue 2 is reduced from six to five. At the same time, the weight counter value of the queue 2 is reduced from one to zero.

Since the weight counter value becomes zero, next queue number 2 is stored in the non-transmittable queue registering list 14. On the other hand, in the leading end of the transmittable queue registering list 13, the queue number 1 is moved up.

In the cell period 3, the queue number 1 at the leading end of the transmittable queue registering list 13 is transmitted. Accordingly, the accumulated cell of the queue 1 is reduced from five to four. At the same time, the weight counter value of the queue 1 is reduced from one to zero.

Since the weight counter value becomes zero, next queue number 1 is stored in the non-transmittable queue registering list 14. Accordingly, the transmittable queue registering list 13 becomes empty (see step S13).

Therefore, all of the weight counter 12 is reset (see step S14), and meaning of the transmittable queue registering list 13 and the non-transmittable queue registering list 14 are switched (see step S15).

Then, the operation is performed in the similar manner in the period 4 and subsequent periods.

From FIG. 8, it can be appreciated that the minimum rate of cell output from the queue is guaranteed at a ratio of the weight value as long as the accumulated cell is present in the queue, and the weight value assigned for the queue having no accumulated cell is distributed in the ratio of weight values of the queues, in which accumulated cells are present.

Namely, during first to eighth period where accumulated cell of the queue 1 becomes zero, four cells from the queue 1 and two cells from the queue 2 are guaranteed at the minimum rate depending upon the weight values, in accordance with the ratio of the weight values. Remaining each one cell is initially assigned for the output from the queue 3 and is assigned according to the ratio of the weight value.

However, in the cell period at the cell period 9 and subsequent cell periods, when number of accumulated cells of the queue 1 and the queue 3 is not present, cells from the queue 2 are output sequentially, and the output cell monitoring parameter from the queue 2 in the ATM line reception terminal in the next stage is assumed that the allowable value of fluctuation of the ideal output interval value is fourth, the output cell of the cell period 12 is disposed by the UPC.

In contrast to this, when judgment is made whether the queue determined by WRR according to the present invention in the same set condition as FIG. 8 can be output or not, the output cell of the period 12 which potentially cause breach of contract is not output (not disposed). The output cell in the cell period 13, in which breach of contracted band is resolved, is output.

According to the present invention, the ATM cell buffer read control system using the band effectively by distributing extra band in the ratio of number of the output ATM cell per connection with guarantee the minimum output band per connection according to the ratio of the output ATM cell number per a preliminarily set given period, includes judgment means for making judgment whether the output band after distribution of the extra band falls within a reference output range or not. It becomes possible to prevent over-rate due to excessive use of the extra line capacity.

According to the present invention, the ATM cell buffer read control method using the band effectively by distributing extra band in the ratio of number of the output ATM cell per connection with guarantee the minimum output band per connection according to the ratio of the output ATM cell number per a preliminarily set given period, includes the first process of making judgment whether the output band after distribution of the extra band falls within a reference output range or not. It becomes possible to prevent over-rate due to excessive use of the extra line capacity.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. An ATM cell buffer read control system for effectively using a band by distributing an extra band with a ratio of number of ATM cell number per connection with guarantee of minimum output band per connection according to preliminarily set ratio of output ATM cell number per a given period, comprising:

judgment means for making judgment whether the output band after distribution of said extra band falls within a reference output range, wherein said judgment means maintains an ATM cell stored in a queue having an output band in said queue when the output band after distribution of said extra band falls out of said reference output band range.

2. An ATM cell buffer read control system as set forth in claim 1, wherein said judgment means outputs the ATM cell held in said queue during next ATM cell output period.

3. An ATM cell buffer read control system as set forth in claim 1, wherein said reference output band is a maximum output band which does not cause an input rate error in an ATM line receiving terminal in the next stage.

4. An ATM cell buffer read control system for effectively using a band by distributing an extra band with a ratio of number of ATM cell number per connection with guarantee of minimum output band per connection according to preliminarily set ratio of output ATM cell number per a given period, comprising:

judgment means for making judgment whether the output band after distribution of said extra band falls within a reference output range;

a plurality of queues provided per connection; queue number identifying means for identifying a connection on the basis of an input ATM cell, storing the ATM cell data in a corresponding queue, and performing output demand of data;

accumulated cell number counting means for counting number of accumulated cell per each queue;

weight counting means for counting ratio of number of output ATM cells in said given period per queue; and registration list selecting means for receiving output demand of data from said queue number identifying means, checking whether transmission of data in said queue is possible or note on the basis of said accumulated cell number before storing of data in the queue storing the data and said weight, and selecting the queue if transmittable, said judgment means making judgment whether the output band of the queue selected by said registration list selecting means falls within said reference output band.

5. An ATM cell buffer read control system as set forth in claim 4, wherein said registration list selection means selects the queue when said accumulated cell number there of is zero and said weight thereof is other than zero.

6. An ATM cell buffer read control system as set forth in claim 4, wherein said registration list selecting means disposes said output demand when said accumulated cell number is other than zero.

7. An ATM cell buffer read control system as set forth in claim 4, wherein said registration list selecting means temporarily withhold selection of the queue when said accumulated cell number thereof is zero and said weight there of is zero.

8. An ATM cell buffer read control system as set forth in claim 7, wherein said registration list selecting means selects said queue which is temporarily withheld selection when no cell to select is remained.

9. An ATM cell buffer read control method for effectively using a band by distributing an extra band with a ratio of number of ATM cell number per connection with guarantee of minimum output band per connection according to preliminarily set ratio of output ATM cell number per a given period, comprising:

a first process of making judgment whether the output band after distribution of said extra band falls within a reference output range, wherein in said first process, an ATM cell stored in a queue having an output band in said queue is maintained when the output band after distribution of said extra band falls out of said reference output band range.

10. An ATM cell buffer read control method as set forth in claim 9, wherein in said first process, the ATM cell held in said queue is output during next ATM cell output period.

11. An ATM cell buffer read control method as set forth in claim 9, wherein said reference output band is a maximum output band which does not cause an input rate error in an ATM line receiving terminal in the next stage.

12. An ATM cell buffer read control method for effectively using a band by distributing an extra band with a ratio of number of ATM cell number per connection with guarantee of minimum output band per connection according to preliminarily set ratio of output ATM cell number per a given period, comprising:

a first process of making judgment whether the output band after distribution of said extra band falls within a reference output range;

proving a plurality of queues per connection;

a second process of identifying a connection on the basis of an input ATM cell, storing the ATM cell data in a corresponding queue, and performing output demand of data;

a third process of counting number of accumulated cell per each queue;

a fourth process of counting ratio of number of output ATM cells in said given period per queue; and a fifth process of receiving output demand of data from said queue number identifying means, checking whether transmission of data in said queue is possible or note on the basis of said accumulated cell number before storing of data in the queue storing the data and said weight, and selecting the queue if transmittable, said first process making judgment whether the output band of the queue selected in said fifth process falls within said reference output band.

13. An ATM cell buffer read control method as set forth in claim 12, wherein in said fifth process, the queue is selected when said accumulated cell number there of is zero and said weight thereof is other than zero.

14. An ATM cell buffer read control method as set forth in claim 12, wherein in said fifth process, said output demand is disposed when said accumulated cell number is other than zero.

15. An ATM cell buffer read control method as set forth in claim 12, wherein in said fifth process, selection of the queue is temporarily withheld when said accumulated cell number thereof is zero and said weight there of is zero.

16. An ATM cell buffer read control method as set forth in claim 15, wherein in said fifth process, said queue which is temporarily withheld selection, is selected when no cell to select is remained.

* * * * *

UNITED STATES PATENT AND TRADEMARK OFFICE
CERTIFICATE OF CORRECTION

PATENT NO.    : 6,738,385 B1
DATED         : May 18, 2004
INVENTOR(S)   : Hiroyuki Iwamoto It is certified that error appears in the above-identified patent and that said Letters Patent is hereby corrected as shown below:

Column 4,
Line 54, "(step S1)" has been replaced with -- (step S11) --.

Signed and Sealed this

Seventeenth Day of August, 2004

JON W. DUDAS
*Acting Director of the United States Patent and Trademark Office*